United States Patent [19]
Ma et al.

[11] Patent Number: 6,042,121
[45] Date of Patent: Mar. 28, 2000

[54] METALLIC SEALING RING

[75] Inventors: Hai-Ping Ma, Lincoln, R.I.; Matthew D. Cunningham, Lakeville, Mass.; Amitava Datta, East Greenwich, R.I.

[73] Assignee: EG&G Sealol, Inc., Cranston, R.I.

[21] Appl. No.: 08/897,694

[22] Filed: Jul. 21, 1997

[51] Int. Cl.[7] ................................................ F16S 15/08
[52] U.S. Cl. .......................... 277/608; 277/626; 277/647; 277/910
[58] Field of Search .................................. 277/435, 608, 277/609, 626, 647, 630, 488, 910, 914, 644

[56] References Cited

U.S. PATENT DOCUMENTS

| | | | |
|---|---|---|---|
| 1,866,160 | 7/1932 | Griswold, Jr. | 277/626 X |
| 2,081,040 | 5/1937 | King | 277/626 X |
| 4,477,087 | 10/1984 | Sutter, Jr. et al. | 277/644 |
| 4,877,272 | 10/1989 | Chevallier et al. | 285/111 |

FOREIGN PATENT DOCUMENTS

| | | |
|---|---|---|
| 0192015 | 8/1986 | European Pat. Off. . |
| 849803 | 9/1960 | United Kingdom . |
| 1368773 | 10/1974 | United Kingdom . |
| 1527344 | 10/1978 | United Kingdom . |
| 9809101 | 3/1998 | WIPO . |

*Primary Examiner*—Lynne H. Browne
*Assistant Examiner*—John R. Cottingham
*Attorney, Agent, or Firm*—Roylance, Abrams, Berdo & Goodman, L.L.P.

[57] ABSTRACT

A seal assembly includes a first plate or member having a recess with a bottom mating surface which receives sealing ring therein and a second plate or member having a sealing surface for contacting a metallic sealing ring. First and second plates or members are coupled together by a plurality of fasteners or bolts. By tightening the fasteners the sealing ring is loaded, and thus, compressed to plastically deform and create an annular seal between the first and second members. Metallic sealing ring has a first annular sealing surface, a second annular sealing surface, an annular inner surface and an annular outer surface. The first annular sealing surface faces in a first axial direction to contact sealing surface of first member for creating a first annular sealing dam therebetween. The second annular sealing surface faces in a second axial direction, which is opposite to the first axial direction of the annular sealing surface, to contact sealing surface of second member for creating a second annular sealing dam therebetween. Preferably, the first and second annular sealing surfaces are substantially flat surfaces which are parallel to one another. An annular column section is formed between the first and second annular surfaces. The minimum radial width of the annular column determines the force necessary to deform the sealing ring to its sealing position. A pair of beam sections extend substantially perpendicular to the column section to create the sealing surfaces. At least one brace extends diagonally between the column section and one of the between sections to obtain proper sealing during compression of the sealing ring.

29 Claims, 6 Drawing Sheets

METALLIC SEALING RING

FIELD OF THE INVENTION

The present invention generally relates to a metallic sealing ring for creating a seal between a pair of members. More specifically, the present inveto relates to a sealing ring that has a wide sealing area to minimize brinelling andrca movement of the sealing area.

BACKGROUND OF THE INVENTION

A typical static seal assembly has a first member with a first mating surface, an annular sealing ring of suitable sealing material (e.g., metal O-ring), and a second member with a second mating surface. A mechanical load is applied to the sealing ring through the first and second mating surfaces of the members. Typically, the mechanical load is created by torquing down a multitude of fasteners such that a displacement, also known as squeeze, occurs between the sealing surfaces. The net loading of the contact surfaces creates the two sealing lines.

The low leakage requirement can be achieved by compressing a solid metal ring of rectangular cross-section with a sufficient force. One problem with a solid metal ring is that the force created could be of sufficient magnitude to cause plastic deformation of the mating surfaces of the members. This plastic deformation of the mating surface is called brinelling. Once brinelled, the probability of proper resealing is drastically reduced without first repairing the damaged sealing surfaces.

The design requirements for static sealing therefore requires an optimum load level and flexibility. A good static seal when squeezed must be able to generate load levels large enough to seal, but not large enough to brinell the cavity surface. Currently, there are many types of metallic sealing rings in the prior art.

The metallic "O" rings were an early effort to meet these conflicting design requirements. However, the resiliency of this type of seal is rather limited because the "O" ring, whether solid or hollow, is usually too stiff, and is inherently expensive. The development of the C-shaped sealing ring was an improvement to the "O" ring. In particular, by simply discarding a portion of the "O", the hoop restraint of the seal is greatly reduced and the seal becomes more flexible. However, common "C" seals typically cannot reach the desirable standard vacuum level of $1.0E^{-9}$ standard (1 atmosphere) cubic centimeters (scc) He/sec. without modification and without being coated with very soft plating materials.

Moreover, the operating principle of the "C" seal is to create and maintain a narrow contact dam between the seal and cavity. Because the contact is localized, the force is also locally concentrated on the seal. Therefore, as long as the seal surface is softer than the cavity surface, the seal face will yield to achieve sealing. The metallic O-ring design utilizes the same principle. Both the "C" and "O" type seals maintain a narrow sealing line, which shifts as the seal is compressed to the working height.

In view of the above, it will be apparent to those skilled in the art that there exists a need for an improved sealing ring with wide sealing areas that minimizes brinelling and shifting of the sealing line. This invention addresses this need in the art as well as other needs which will become apparent to those skilled in the art once given this disclosure.

SUMMARY OF THE INVENTION

One object of the present invention is to provide a metallic beam-column sealing ring.

Another object of the present invention is to provide a metallic sealing ring which has geometrically simple cross sections, and can be manufactured with existing equipment in large quantities with tight tolerances.

Still another object of the present invention is to provide a metallic sealing ring which provides a wide sealing dam for a large range of squeeze with superior high sealing capability.

Yet another object of the present invention is to provide a metallic sealing ring in which the seal dam does not significantly shift during compression of the sealing ring.

Another object of the present invention is to provide a metallic sealing ring which uses controlled column buckling to limit reaction forces and avoid deformation and brinelling.

Yet still another object of the present invention is to provide such a metallic beam-column sealing ring which has high reliability and 100% yield.

Another object of the present invention is to provide a metallic beam column sealing ring which has a leakage rate of less than $1.0E^{-9}$ scc/sec He.

The invention results from the realization that a truly superior seal made wholly of metal in the nature of a "C" seal can be effected utilizing a construction that has two spaced structured beams interconnected by a structured column which provides an extensive seal and buckles in a controlled fashion to maintain the seal without shifting of the sealing line or brinelling the mating surfaces of the members to be sealed.

The foregoing objects can basically be attained by providing a metallic sealing ring comprising a first annular beam section with a first annular sealing surface facing in a first axial direction to contact a first member for creating a first annular sealing dam therebetween; a second annular beam section with a second annular sealing surface facing in a second axial direction, which is opposite to the first axial direction, to contact a second member for creating a second annular sealing dam therebetween; an annular inner surface extending between the first and second sealing surfaces to form a central passageway; and an annular outer surface extending between the first and second sealing surfaces and spaced from the annular inner surface to form an annular column section of material extending between the first and second sealing surfaces and substantially perpendicular thereto, one of the annular inner and outer surfaces having annular recess extending in a substantially radial direction to at least partly defme a minimum width of the annular column section, the annular recess being configured to form a first diagonal brace extending from the annular column section to the first beam section.

In a preferred embodiment each of the beam sections may include a flat sealing surface. The flat sealing surfaces may be parallel and they may be perpendicular to the axis of the seal. There may be a diagonal brace associated with each beam. There may be a recess between the beam structures for defining at least one brace and the width of the column structure. The seal may be made of metal such as nickel or aluminum or it may be made of alloy steel such as 316L stainless steel. The column may be a slender column. The column may be at least as high as it is wide. The beams and column may be integral. The one or more braces may be integral with the beams and column. The braces may be oriented at approximately 45°.

Other objects, salient features and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form part of this original disclosure.

DETAILED DESCRIPTION OF THE PREFERRED EMBODIMENTS

Figure 1:
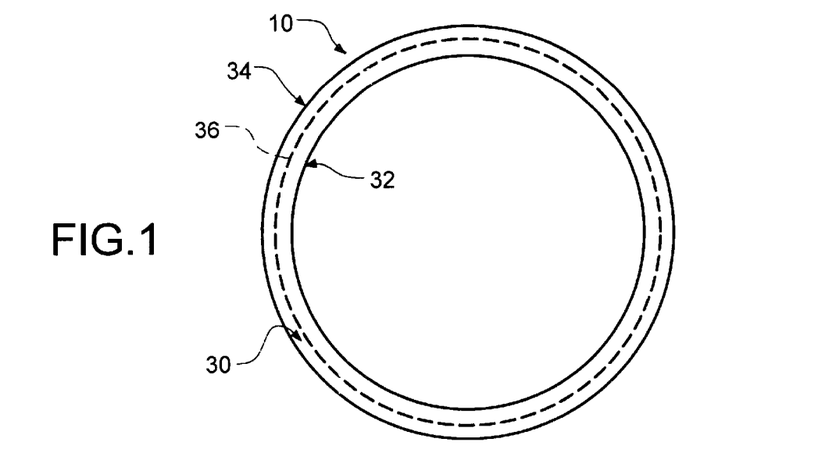
FIG. 1 is a top plan view of a metallic sealing ring in accordance with a first embodiment of the present invention.
Figure 2:
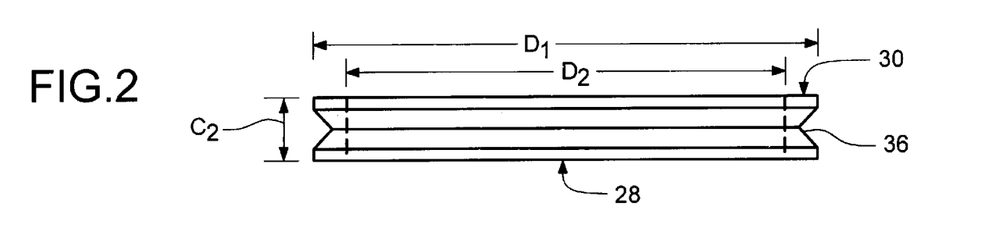
FIG. 2 is a side elevational view of the metallic sealing ring illustrated in FIG. 1 in which an annular recess is formed in its annular outer surface of the sealing ring to form two diagonal braces.

Initially referring to FIGS. 1 and 2, a metallic sealing ring 10 in accordance with a first embodiment of the present invention is illustrated. Metallic sealing ring 10 is illustrated as being circular. However, it will be apparent to those skilled in the art from this disclosure that sealing ring 10 could have other types of non-circular ring shapes. Moreover, while metallic sealing ring 10 is illustrated as being constructed of a one-piece, unitary piece of material, it will be apparent to those skilled in the art from this disclosure that it is possible to construct sealing ring 10 of several pieces fixedly coupled together as seen in one of the later embodiments of the present invention. In any event, metallic sealing ring 10 is preferably machined to its desired shape from a suitable metallic material having the desired sealing properties. For example, sealing ring 10 can be constructed of pure nickel, aluminum, or a high strength steel alloy such as 316L stainless steel, or any other suitable sealing material.

Figure 3:
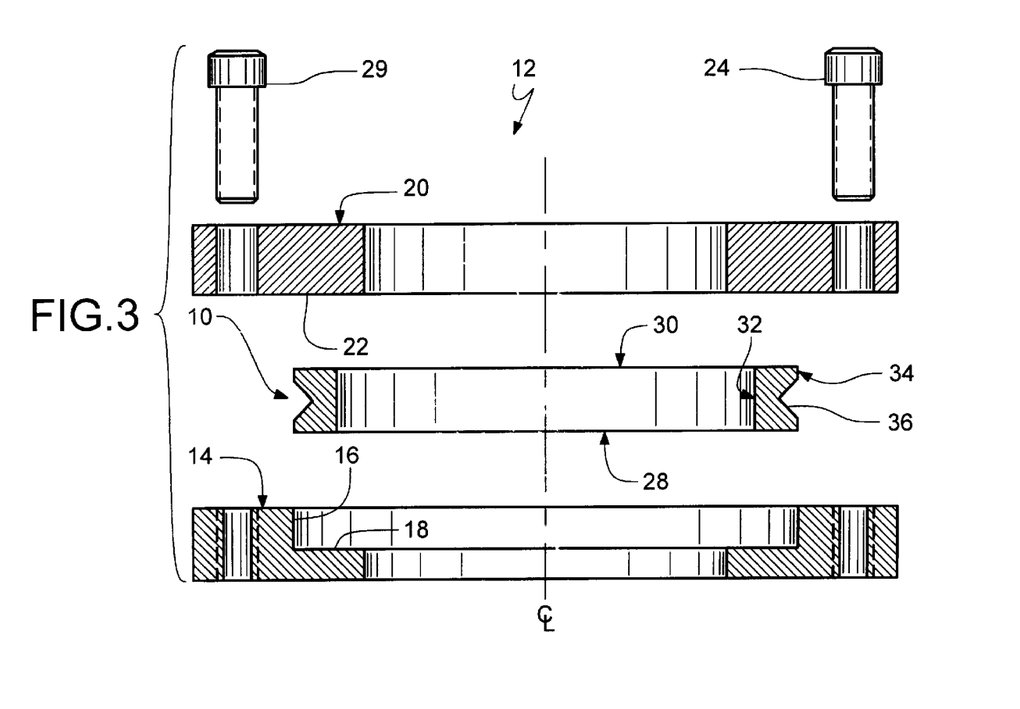
FIG. 3 is an exploded, longitudinal cross-sectional view of the metallic sealing ring illustrated in FIG. 1 together with a seal assembly having a pair of mating members or plates which are coupled together by fasteners to axially compress the metallic sealing ring for creating an annular seal therebetween.
Figure 4:
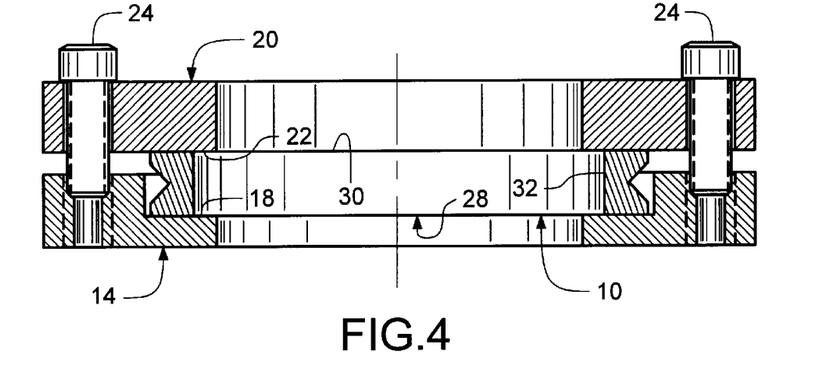
FIG. 4 is a longitudinal cross-sectional view of the mating members and the metallic sealing ring prior to compression of the metallic sealing ring, i.e., unloaded.
Figure 5:
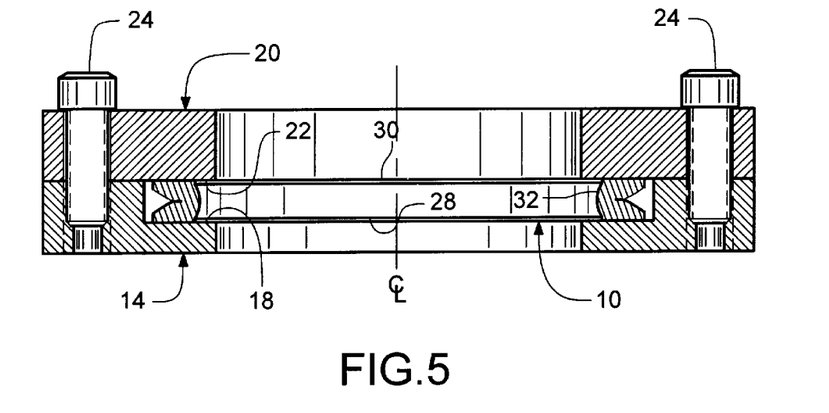
FIG. 5 is a longitudinal cross-sectional view, similar to FIG. 4, of the mating members and the metallic sealing ring, but after the mating members have been coupled together by the fasteners to compress the metallic sealing ring for creating an annular seal therebetween.

As seen in FIGS. 3–5, a sealing assembly 12 in accordance with a first embodiment of the present invention is illustrated in which metallic sealing ring 10 forms a part thereof. More specifically, seal assembly 12 includes a first plate or member 14 having a recess 16 with a first mating or sealing surface 18 which receives sealing ring 10 therein and a second plate or member 20 having a mating or sealing surface 22 for contacting sealing ring 10. First and second plates or members 14 and 20 are coupled together by a plurality of fasteners or bolts 24. By tightening fasteners 24, sealing ring 10 is loaded, and thus, compressed to plastically deform and create an annular seal between first and second members 14 and 20. Deformation of sealing ring 10 is approximately 12% to 30% of the axial height of the sealing ring between its sealing surfaces.

Figure 6:
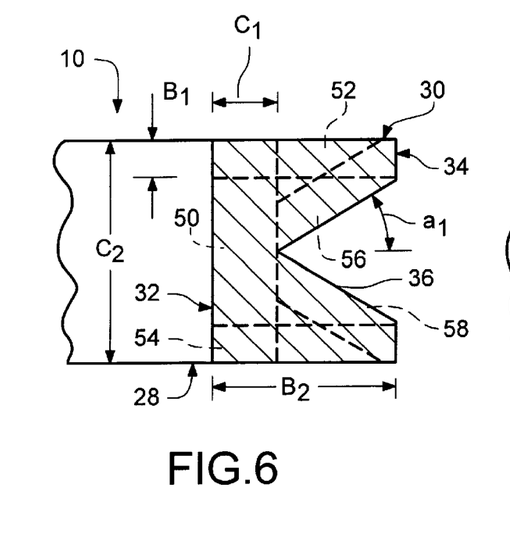
FIG. 6 is an enlarged, partial cross-sectional view of a portion of the metallic sealing ring illustrated in FIGS. 1–5, with essential dimensions illustrated.

As best seen in FIG. 6, metallic sealing ring 10 has a first annular sealing surface 28, a second annular sealing surface 30, an annular inner surface 32 and an annular outer surface 34. First annular sealing surface 28 faces in a first axial direction to contact sealing surface 18 of first member 14 for creating a first annular sealing dam therebetween. Second annular sealing surface 30 faces in a second axial direction, which is opposite to the first axial direction of annular sealing surface 28, to contact sealing surface 22 of second member 20 for creating a second annular sealing dam therebetween. Preferably, first and second annular sealing surfaces 28 and 30 are substantially flat surfaces which are parallel to one another and perpendicular to the center axis of sealing ring 10. Optionally, annular sealing surfaces 28 and 30 can be coated with a smearable plating or the like. However, such a smearable plating is typically unnecessary in sealing rings of the present invention.

Annular inner surface 32 extends between first and second annular sealing surfaces 28 and 30 to form a central passageway which is surrounded by inner surface 32. In this particular embodiment, inner annular surface 32 extends substantially perpendicular to first and second sealing surfaces 28 and 30. However, it will be apparent to those skilled in the art from this disclosure that inner surface 32 can be further machined to decrease the amount of the loading force necessary to deform sealing ring 10 in subsequent embodiments. Moreover, as seen in the other embodiments explained below, inner surface 32 can be contoured such as to have an annular recess or the like.

Annular outer surface 34 extends between first and second sealing surfaces 28 and 30, and is spaced radially outwardly from annular inner surface 32. Outer surface 34 has an annular recess 36 extending in a substantially radial direction to control the amount of loading force necessary to deform sealing ring 10. Preferably, recess 36 is a continuous recess with a uniform shape.

Figure 10:
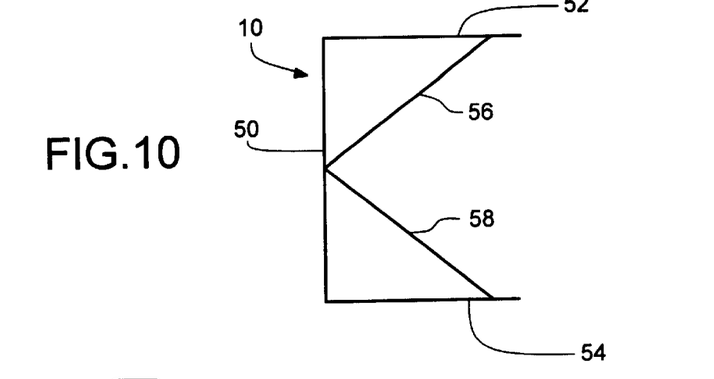
FIG. 10 is an equivalent diagrammatic view of the metallic sealing ring illustrated in FIGS. 1–9, showing the column, beams and braces formed therein.

Sealing ring 10 can be basically broken down to five sections (shown in broken lines). In particular, sealing ring 10 has a slender column section 50, a first beam section 52, a second beam section 54, a first diagonal brace section 56 and a second diagonal brace section 58. The slender column section 50 extends between annular sealing surfaces 28 and 30 and overlaps portions of the beam sections 52 and 54. In particular, beam sections 52 and 54 extend between annular inner surface 32 and annular outer surface 34 of sealing ring 10. The diagonal brace sections 56 and 58 are angled relative to column section 50 and beam sections 52 and 54 to define annular recess 36. In this particular embodiment, the diagonal brace sections 56 and 58 extend approximately from the mid point of column section 50 towards the outer ends of beam sections 52 and 54 to provide support for beam sections 52 and 54 at their outer ends. This can be better seen by the line drawing in FIG. 10, which diagrammatically illustrates the sections of sealing ring 10 as straight lines to represent the column, beams and braces forming sealing ring 10. The shape of recess 36 is determined by the desired seal widths of sealing surfaces 28 and 30, the desired minimum column width $C_1$, the effective angles of brace sections 56 and 58 and the thickness or depth $B_1$ of beam sections 52 and 54.

The geometric and dimensional characteristics of sealing ring 10 can be particularly seen in FIGS. 2 and 6. Referring initially to FIG. 2, the outer diameter $D_1$ of sealing ring 10 can be any desired shape depending upon the application of sealing ring 10, i.e., there is no limit to its outer diameter. The inner diameter $D_2$ of sealing ring 10 should be at least approximately 0.008 inch or greater. The free axial height of sealing ring 10 is equal to the height $C_2$ of annular column section 50 which is typically between approximately 0.020 inch to approximately 1.0 inch. The radial width of sealing ring 10 is the difference between the outer diameter $D_1$ and the inner diameter $D_2$, i.e., the distance between outer surface 34 and inner surface 32. In this preferred embodiment, the radial width of the sealing ring 10 is preferably at least approximately 0.020 inch or greater. Moreover, the seal width in this embodiment extends the entire length of annular sealing surfaces 28 and 30.

Referring now to FIG. 6, the shape of sealing ring 10 is typically made by machining a groove into outer surface 34 of sealing ring 10. Preferably, a simple shaped cut is made in the outer diameter or surface 34 of sealing ring 10 to form annular recess 36. Preferably, a plurality of sealing rings can be made from a metallic tube or pipe by forming a plurality of grooves in the outer surface of a metal pipe or tube. After a plurality of recesses 36 are constructed on the outer surface 34 of the pipe, and the pipe is then cut in-between the annular recesses 36 to the desired sealing ring height $C_2$ to create a plurality of sealing rings 10. The cut on outer surface 34 creates one or two diagonal brace sections 56 and 58, as well as defines the effective minimum width $C_1$ of the column section 50 and the effective minimum thickness $B_1$ of beam sections 52 and 54. Preferably, each of the diagonal brace sections 56 and 58 has a slant angle in the range of 45° plus or minus 10°.

The effective minimum column width $C_1$ of column section 50 is typically between approximately 0.008 inch and approximately 0.030 inch. The height $C_2$ of annular column section 50, as mentioned above, is preferably in the range of approximately 0.020 inch to approximately 1.0 inch. The ratio between the height $C_2$ of annular column section 50 and the effective minimum width $C_1$ of annular column section 50 is preferably 3:1 or greater, i.e., the height $C_2$ is three times or greater than the effective minimum width $C_1$ of column section 50. When the annular column height $C_2$ is less than 1.0 inch (smaller sealing rings) the more optimum range of the effective column width $C_1$ of column section 50 is between 0.008 inch and approximately 0.020 inch. In other words, the taller the sealing ring, the wider the effective minimum column width $C_1$ can be in comparison to smaller sealing rings.

The axial thickness or depth $B_1$ of beam sections 52 and 54 depends upon brace sections 56 and 58. In particular, the axial depth $B_1$ of beam sections 52 and 54 can be effectively zero. In other words, annular sealing surfaces 28 and 30 can meet with recess 36 to form a point. However, if one of the brace sections 56 or 58 is eliminated, then the beam section 52 or 54 without the brace section 56 or 58 should have an axial depth $B_1$ of at least approximately 0.010 inch.

Beam sections 52 and 54 preferably have a radial width $B_2$ of at least 0.020 inch or greater. Preferably, the radial widths $B_2$ of beam sections 52 and 54 are equal to one another and equal to the widths of the sealing surfaces 28 and 30. Of course, the widths $B_2$ of beam sections 52 and 54 can be different, if needed and/or desired.

Although thus far seal ring 10 has been depicted with annular recess 36 associated with outer surface 34, this is not a necessary limitation of the invention as annular recess 36 can be made on inner surface 32 such that recess 36 faces radially inwardly towards the center axis of sealing ring 10.

Moreover, while sealing ring 10 is shown with the beam sections 52 and 54, diagonal brace sections 56 and 58 and the column section 50 all integrally formed, this is not a necessary limitation of the invention as any one or more of them may be formed independently of the others as mentioned above.

Figure 7:
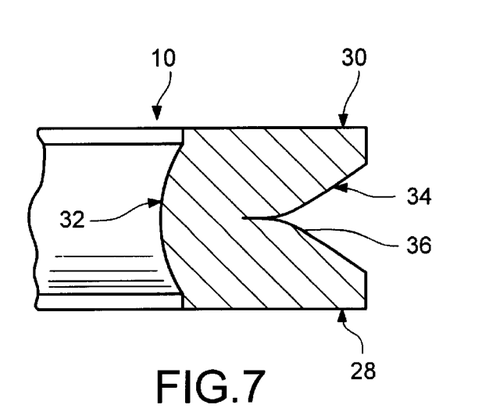
FIG. 7 is an enlarged, partial cross-sectional view of a portion of the metallic sealing ring illustrated in FIGS. 1–6, after being compressed.
Figure 8:
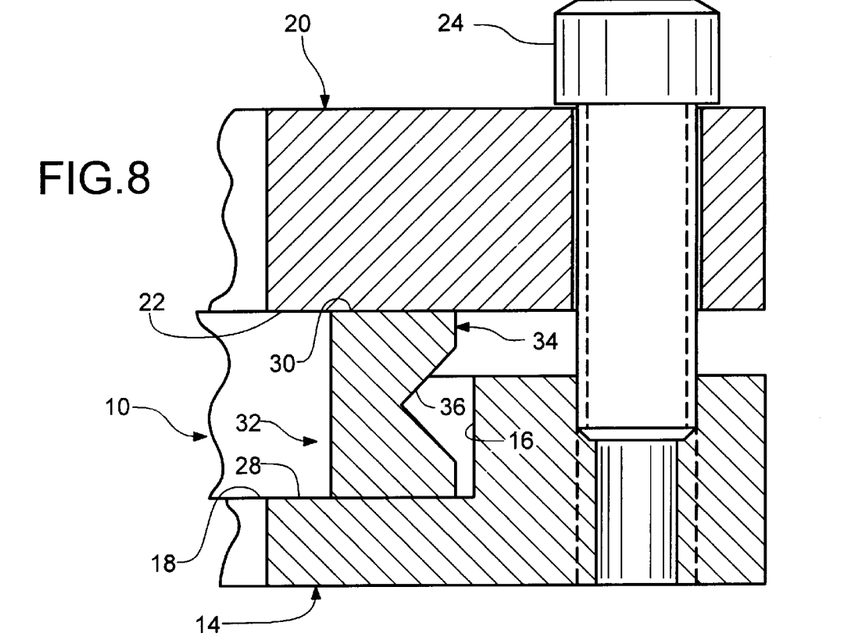
FIG. 8 is an enlarged, partial cross-sectional view of the mating members and the metalic sealing ring illustrated in FIGS. 1–6, prior to compression of the metallic sealing ring, i.e., unloaded.
Figure 9:
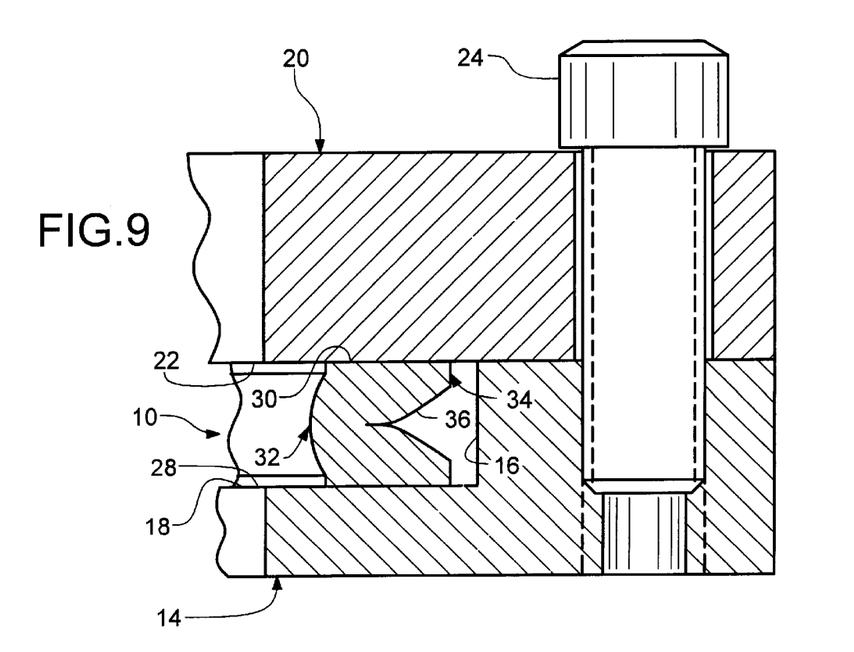
FIG. 9 is an enlarged, partial cross-sectional view, similar to FIG. 8, of the mating members and the metallic sealing ring illustrated in FIGS. 1–6, but after the mating members have been coupled together by the fasteners to compress the metallic sealing ring for creating an annular seal therebetween.

In use, sealing ring 10 is placed between member 14 and member 20 of seal assembly 12. The flat sealing dams of sealing surfaces 28 and 30 are in full sealing contact with the sealing surfaces 18 and 22 of members 14 and 20, respectively, when seal assembly 12 is coupled together as seen in FIG. 5. In particular, members 14 and By 20 are fastened together by a plurality of fasteners 24 (only two shown) which presses or squeezes sealing ring 10 so that it bulges somewhat at a portion of inner surface 32 as seen in FIG. 7. Thus, sealing ring 10 does not significantly shift or expand the seal contact, and thus, maintains a better and more secure seal. The beam sections 52 and 54 and column section 50 collapse in a controlled fashion, limiting the reaction forces. The seal point does not shift or expand but maintains a constant seal contact.

Prior Art v. Sealing Ring 10

Figure 11:
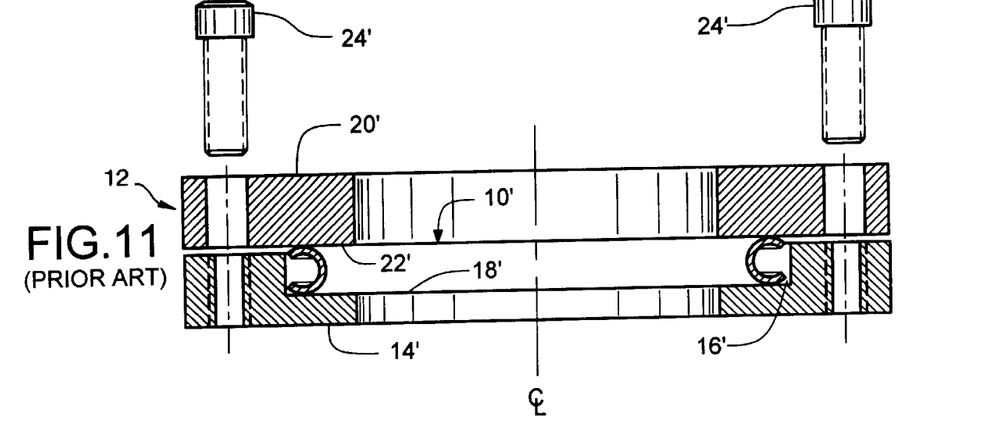
FIG. 11 is a side longitudinal cross-sectional view of a prior art "C" ring seal in a sealing assembly.
Figure 12:
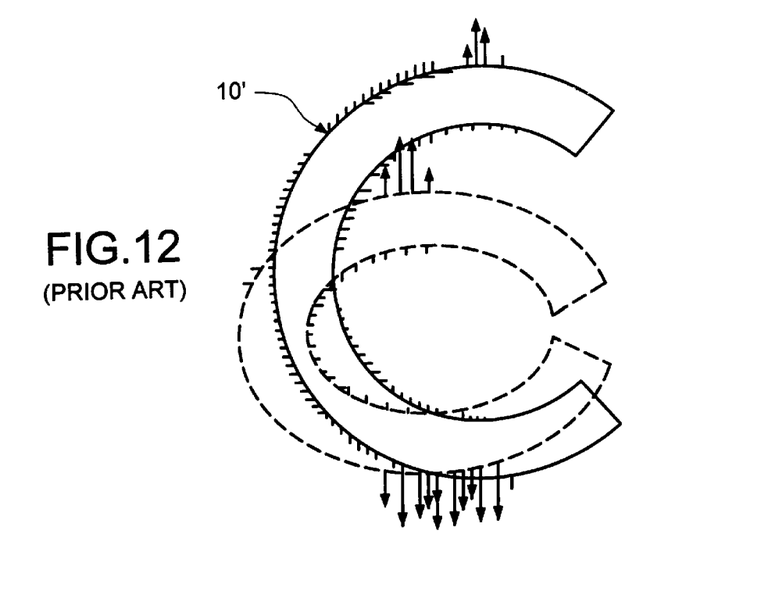
FIG. 12 is a schematic side cross-sectional view of a prior art "C" seal in its unloaded pition in full lines and its compressed or loaded position in broken lines.

As shown in FIG. 11, a conventional seal assembly 12' is illustrated and includes a base plate or member 14' having a recess 16' with a bottom sealing surface 18' which receives C-shaped sealing ring 10' therein. A cover plate or member 20' with top sealing surfaces 22' with top sealing surface 22' is fastened to base plate or member 14' and clamped down by a plurality of fasteners 24' to bring sealing surface 22' to bear on the other side of "C" ring or sealing ring 10'. Initially such a conventional "C" seal, shown in FIG. 12, unloaded and in an unconstrained environment, has a single points or lines of contact at the top and the bottom where it meets with the sealing surfaces 18' and 22'. However, upon loading sealing ring 10' as seen in FIG. 12, the sealing ring 10 compresses and that seal dam line shifts and expands. This shifts the seal contact and interferes with the sealing action.

In contrast, sealing ring 10 according to this invention, has two extended flat sealing surfaces 28 and 30 which are formed by two structural beam sections 52 and 54 supported by a slender structural column section 50 and reinforced by two diagonal brace sections 56 and 58. Slender column section 50 is typically taller or higher than it is wide. For example, column section 50 can be three times taller than it is wide. Brace sections 56 and 58 are typically at a 45° angle with respect to beam sections 52 and 54. Accordingly, a wide sealing area is created on both sealing surfaces 28 and 30 which does not significantly shift during compression of sealing ring 10.

Second Embodiment

Figure 13:
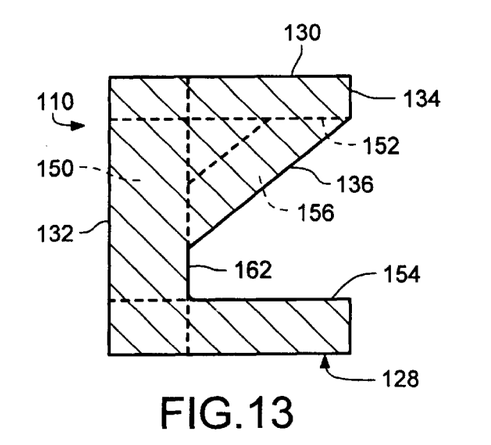
FIG. 13 is an enlarged, partial cross-sectional view of a portion of a metallic sealing ring in accordance with a second embodiment of this invention, with an outer recess defining one diagonal brace.
Figure 14:
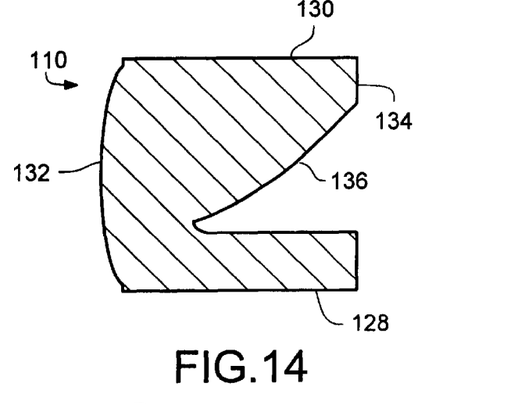
FIG. 14 is an enlarged, partial cross-sectional view of a portion of the metallic sealing ring illustrated in FIG. 13 in accordance with the second embodiment of the present invention, after the sealing ring has been loaded to a sealing position.
Figure 15:
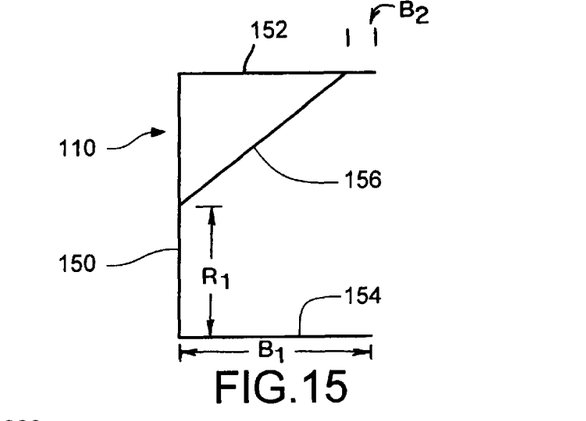
FIG. 15 is an equivalent diagrammatic view of the metallic sealing ring illustrated in FIG. 13 and 14 in accordance with the second embodiment, showing the column, beam and braces formed therein.

Referring to FIGS. 13–15, a metallic sealing ring 110 in accordance with a second embodiment of the present invention is illustrated. Although only a portion of metallic sealing ring 110 is illustrated herein, it will be apparent to those skilled in the art from this disclosure that sealing ring 110 is a continuous ring which can be either circular or non-circular. Preferably, the cross-section of sealing ring 110 is uniform as it extends about the periphery of sealing ring 110. Moreover, while metallic sealing ring 110 is illustrated as being constructed of a one-piece, unitary piece of material, it will be apparent to those skilled in the art from this disclosure that it is possible to construct sealing ring 110 of more than one pieces. In any event, metallic sealing ring 110 is preferably machined to its desired shape from a suitable metallic material having the desired sealing properties. For example, sealing ring 110 can be constructed of pure nickel, aluminum, or a high strength steel alloy such as 316L stainless steel, or any other suitable sealing material.

In view of the similarities of sealing ring 110 to sealing ring 10, discussed above, sealing ring 110 will not be discussed or illustrated in detail herein. Basically, metallic sealing ring 110 has a first annular sealing surface 128, a second annular sealing surface 130, a first annular connecting surface 132 and a second annular connecting surface 134. In this embodiment, as illustrated by the broken lines, sealing ring 110 has a slender column section 150, a first beam section 152, a second beam section 154 and only one diagonal brace section 156. A root gap 162 is formed between beam section 154 and brace section 156 to control the contact pattern and the load when only one beam is used. The root gap 162 has an axial height $R_1$ of approximately 0.005 inch to approximately 0.15 inch. Since only one brace section 156 is used, it is important that the radial depth $B_1$ of second beam section 154 be approximately 0.010 or greater. Beam section 152, on the other hand, is supported by brace section 156 such that the radial depth $B_2$, of beam section 152 extending past brace sections 156 can be zero.

When sealing ring 110 is used with sealing assembly 12, discussed above, first annular sealing surface 128 faces in a first axial direction to contact sealing surface 18 of first member 14 for creating a first annular sealing dam therebetween. Second annular sealing surface 130 faces in a second axial direction, which is opposite to the first axial direction of annular sealing surface 128, to contact sealing surface 22 of second member 20 for creating a second annular sealing dam therebetween. Preferably, first and second annular sealing surfaces 128 and 130 are substantially flat surfaces which are parallel to one another.

Annular connecting surfaces 132 and 134 extend between first and second annular sealing surfaces 128 and 130. In this particular embodiment, annular connecting surface 132 extends substantially perpendicular to first and second sealing surfaces 128 and 130. Connecting surface 134 has an annular recess 136 extending in a substantially radial direction to control the amount of loading force necessary to deform sealing ring 110. It will be apparent to those skilled in the art from this disclosure that annular connecting surfaces 132 and 134 can be arranged similar to the first embodiment, i.e., where surface 132 is the inner surface and surface 134 is outer surface, or vice-a-versa. In other words, the annular recess 136 of sealing ring 110 as seen in FIGS. 13–15 can be formed on either the inner or outer diameter of metallic sealing ring 110.

Third Embodiment

Figure 16:
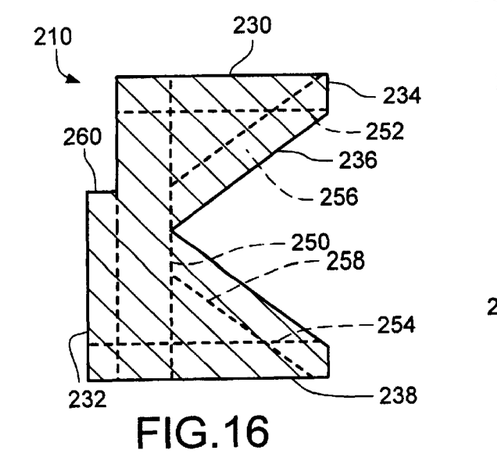
FIG. 16 is an enlarged, partial cross-sectional view of a portion of a metallic sealing ring in accordance with a third embodiment of this invention, with a recess defining two diagonal brace and a notch decreasing the effective area of the column.
Figure 17:
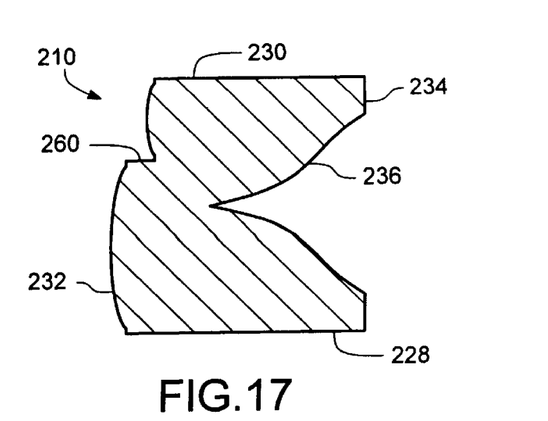
FIG. 17 is an enlarged, partial cross-sectional view of a portion of the metallic sealing ring illustrated in FIG. 16 in accordance with the third embodiment of the present invention, after the sealing ring has been loaded to a sealing position.

Referring to FIGS. 16 and 17, a metallic sealing ring 210 in accordance with a third embodiment of the present invention is illustrated. Sealing ring 210 is nearly identical to sealing ring 10, discussed above, except that sealing ring 210 has an annular notch 260 formed on either its inner or outer diameter, depending on which surface recess 236 is formed. Notch 260 is used to decrease the effective minimum width of column section 250 to decrease the load needed to compress sealing ring 210 as seen in FIG. 17.

In view of the similarities of sealing ring 210 to sealing ring 10, discussed above, sealing ring 210 will not be discussed or illustrated in detail herein. Basically, metallic sealing ring 210 has a first annular sealing surface 228, a second annular sealing surface 230, a first annular connecting surface 232 and a second annular connecting surface 234. In this embodiment, as illustrated by the broken lines, sealing ring 210 has a slender column section 250, a pair of beam sections 252 and 254 and a pair of diagonal brace sections 256 and 258.

Although only a portion of metallic sealing ring 210 is illustrated herein, it will be apparent to those skilled in the art from this disclosure that sealing ring 210 is a continuous ring which can be either circular or non-circular. Preferably, the cross-section of sealing ring 210 is uniform. Moreover, while metallic sealing ring 210 is illustrated as being constructed of a one-piece, unitary piece of material, it will be apparent to those skilled in the art from this disclosure that it is possible to construct sealing ring 210 of more than one pieces. In any event, metallic sealing ring 210 is preferably machined to its desired shape from a suitable metallic material having the desired sealing properties. For example, sealing ring 210 can be constructed of pure nickel, aluminum, or a high strength steel alloy such as 316L stainless steel, or any other suitable sealing material.

When sealing ring 210 is used with sealing assembly 12, discussed above, first annular sealing surface 228 faces in a first axial direction to contact sealing surface 18 of first member 14 for creating a first annular sealing dam therebetween. Second annular sealing surface 230 faces in a second axial direction, which is opposite to the first axial direction of annular sealing surface 228, to contact sealing surface 22 of second member 20 for creating a second annular sealing dam therebetween. Preferably, first and second annular sealing surfaces 228 and 230 are substantially flat surfaces which are parallel to one another.

Annular connecting surfaces 232 and 234 extend between first and second annular sealing surfaces 228 and 230. In this particular embodiment, annular connecting surface 232 extends substantially perpendicular to first and second sealing surfaces 228 and 230. Connecting surface 234 has an annular recess 236 extending in a substantially radial direction to control the amount of loading force necessary to deform sealing ring 210. It will be apparent to those skilled in the art from this disclosure that annular connecting surfaces 232 and 234 can be arranged similar to the first embodiment, i.e., where surface 232 is the inner surface and surface 234 is outer surface, or vice-a-versa. In other words, the annular recess 236 of sealing ring 210 as seen in FIGS. 16 and 17 can be formed on either the inner or outer diameter of metallic sealing ring 210.

Fourth Embodiment

Figure 18:
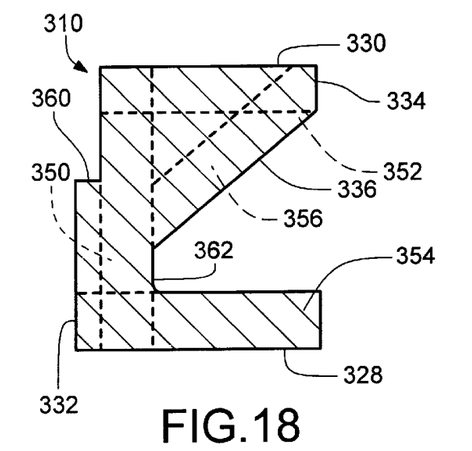
FIG. 18 is an enlarged, partial cross-sectional view of a portion of a metallic sealing ring in accordance with a fourth embodiment of this invention, with a recess defining one diagonal brace and a notch decreasing the effective area of the column.
Figure 19:
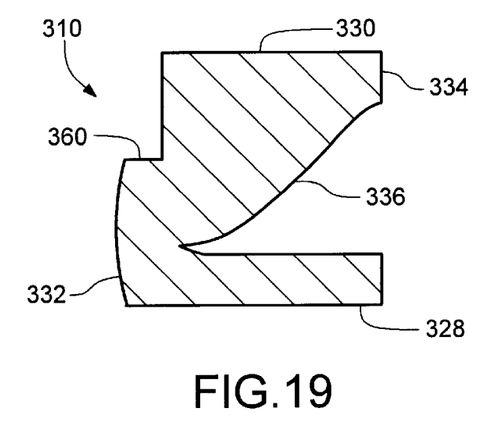
FIG. 19 is an enlarged, partial cross-sectional view of a portion of the metallic sealing illustrated in FIG. 18 in accordance with the fourth embodiment of the present invention, after the sealing ring has been loaded to a sealing position.

Referring to FIGS. 18 and 19, a metallic sealing ring 310 in accordance with a fourth embodiment of the present invention is illustrated. This embodiment is similar to sealing ring 110, discussed above, but has an annular notch 360 formed on either its inner or outer diameter as in the third embodiment. Notch 360 is used to decrease the effective minimum width of column section 350 to decrease the load needed to compress sealing ring 310 as seen in FIG. 19.

In view of the similarities of sealing ring 310 to sealing ring 10, discussed above, sealing ring 310 will not be discussed or illustrated in detail herein. Basically, metallic sealing ring 310 has a first annular sealing surface 328, a second annular sealing surface 330, a first annular connecting surface 332 and a second annular connecting surface 334. In this embodiment, as illustrated by broken lines, sealing ring 310 has a slender column section 350, a pair of beam sections 352 and 354 and only one brace section 356. A root gap 362 is formed within recess 336 to control the contact pattern and the load when only one beam is used.

Although only a portion of metallic sealing ring 310 is illustrated herein, it will be apparent to those skilled in the art from this disclosure that sealing ring 310 is a continuous ring which can be either circular or non-circular. Preferably, the cross-section of sealing ring 310 is uniform. Moreover, while metallic sealing ring 310 is illustrated as being constructed of a one-piece, unitary piece of material, it will be apparent to those skilled in the art from this disclosure that it is possible to construct sealing ring 310 of more than one pieces. In any event, metallic sealing ring 310 is preferably machined to its desired shape from a suitable metallic material having the desired sealing properties. For example, sealing ring 310 can be constructed of pure nickel, aluminum, or a high strength steel alloy such as 316L stainless steel, or any other suitable sealing material.

When sealing ring 310 is used with sealing assembly 12, discussed above, first annular sealing surface 328 faces in a first axial direction to contact sealing surface 18 of first member 14 for creating a first annular sealing dam therebetween. Second annular sealing surface 330 faces in a second axial direction, which is opposite to the first axial direction of annular sealing surface 328, to contact sealing surface 22 of second member 20 for creating a second annular sealing dam therebetween. Preferably, first and second annular sealing surfaces 328 and 330 are substantially flat surfaces which are parallel to one another.

Annular connecting surfaces 332 and 334 extend between first and second annular sealing surfaces 328 and 330. In this particular embodiment, annular connecting surface 332 extends substantially perpendicular to first and second sealing surfaces 328 and 330. Connecting surface 334 has an annular recess 336 extending in a substantially radial direction to control the amount of loading force necessary to deform sealing ring 310. It will be apparent to those skilled in the art from this disclosure that annular connecting surfaces 332 and 334 can be arranged similar to the first embodiment, i.e., where surface 332 is the inner surface and surface 334 is outer surface, or vice-a-versa. In other words, the annular recess 336 of sealing ring 310 as seen in FIGS. 18 and 19 can be formed on either the inner or outer diameter of metallic sealing ring 310.

Fifth Embodiment

Figure 20:
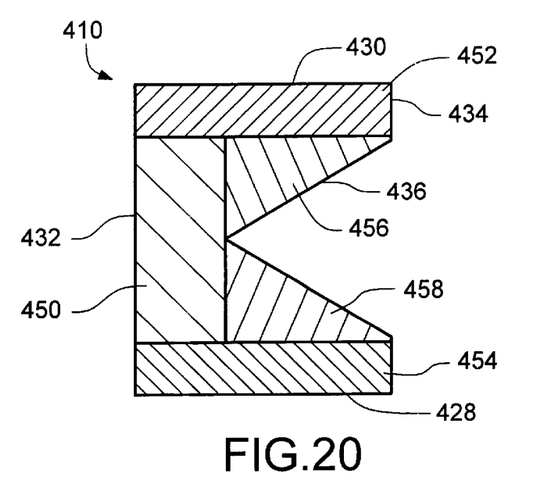
FIG. 20 is an enlarged, partial cross-sectional view of a portion of a metallic sealing ring in accordance with a fifth embodiment of this invention, which is similar to the first embodiment, except that the column, beams and braces are formed from separate pieces of materials.

Referring now to FIG. 20, a metallic sealing ring 410 in accordance with a fifth embodiment of the present invention is illustrated. Metallic sealing ring 410 is similar to sealing ring 10, discussed above, except that sealing ring 410 is constructed from several pieces of material. The pieces of sealing ring 410 are preferably constructed of pure nickel, aluminum, or a high strength steel alloy such as 316L stainless steel, or any other suitable sealing material. Of course, each piece of sealing ring 410 can be the same material as other pieces or of a different material from any other piece, or any combination thereof.

In view of the similarities of sealing ring 410 to sealing ring 10, discussed above, sealing ring 410 will not be discussed or illustrated in detail herein. Basically, metallic sealing ring 410 has a first beam section 458 having a first annular sealing surface 428 a second beam section 452 having, a second annular sealing surface 430, a column section 450 having a first annular connecting surface 432 and a second annular connecting surface 434. First annular sealing surface 428 faces in a first axial direction to contact sealing surface 18 of first member 14 for creating a first annular sealing dam therebetween. Second annular sealing surface 430 faces in a second axial direction, which is opposite to the first axial direction of annular sealing surface 428, to contact sealing surface 22 of second member 20 for creating a second annular sealing dam therebetween. Preferably, first and second annular sealing surfaces 428 and 430 are substantially flat surfaces which are parallel to one another. Although only a portion of metallic sealing ring 410 is illustrated herein, it will be apparent to those skilled in the art from this disclosure that sealing ring 410 is a continuous ring which can be either circular or non-circular. Preferably, the cross-section of sealing ring 410 is uniform about the periphery of sealing ring 410.

Annular connecting surfaces 432 and 434 extend between first and second annular sealing surfaces 428 and 430. In this particular embodiment, annular connecting surface 432 extends substantially perpendicular to first and second sealing surfaces 428 and 430. Connecting surface 434 has an annular recess 436 extending in a substantially radial direction to control the amount of loading force necessary to deform sealing ring 410. It will be apparent to those skilled in the art from this disclosure that annular connecting surfaces 432 and 434 can be arranged similar to the first embodiment, i.e., where surface 432 is the inner surface and surface 434 is outer surface, or vice-a-versa. In other words, the annular recess 436 of sealing ring 410 as seen in FIG. 20 can be formed on either the inner or outer diameter of metallic sealing ring 410.

While several embodiments have been chosen to illustrate the present invention, it will be understood by those skilled in the art that various changes and modifications can be made herein without departing from the scope of the present invention as defined in the appended claims.

What is claimed is:

1. A metallic sealing ring comprising:

a first annular beam section with a first annular sealing surface facing in a first axial direction to contact a first member for creating a first annular sealing dam therebetween;

a second annular beam section with a second annular sealing surface facing in a second axial direction, which is opposite to said first axial direction, to contact a second member for creating a second annular sealing dam therebetween, said first and second annular sealing surfaces being substantially parallel to each other;

an annular inner surface extending between said first and second sealing surfaces to form a central passageway; and an annular outer surface extending between said first and second sealing surfaces and spaced from said annular inner surface to form an annular column section of material extending between said first and second sealing surfaces and substantially perpendicular thereto, one of said annular inner and outer surfaces having an annular recess extending in a substantially radial direction to at least partly define an effective minimum width of said annular column section, said annular recess being configured to form a first diagonal brace section extending from said annular column section to said first beam section to control buckling of said first beam section and column section under axial compression of said sealing ring.

2. The metallic sealing ring according to claim 1, wherein said effective minimum width of said annular column section lies within the range of approximately 0.008 inch to approximately 0.030 inch.

3. The metallic sealing ring according to claim 1, wherein said annular column section has an axial height of less than 1.0 inch.

4. The metallic sealing ring according to claim 3, wherein said effective minimum width of said annular column section lies within the range of approximately 0.008 inch to approximately 0.030 inch.

5. The metallic sealing ring according to claim 1, wherein said first and second sealing surfaces are substantially flat in an uncompressed state to form flat sealing lines upon compression.

6. The metallic sealing ring according to claim 5, wherein said flat sealing surfaces are substantially perpendicular to a center axis of said sealing ring.

7. The metallic sealing ring according to claim 1, wherein said column section and said beam sections are integrally constructed from a one-piece, unitary member.

8. The metallic sealing ring according to claim 7, wherein said minimum width of said column section lies within the range of approximately 0.008 inch to approximately 0.030 inch.

9. The metallic sealing ring according to claim 1, wherein said second beam section has a minimum axial depth of at least approximately 0.010 inch.

10. The metallic sealing ring according to claim 1, wherein said column section has an axial height between said sealing surfaces at least as high as said effective minimum width.

11. The metallic sealing ring according to claim 10, wherein said height of said column section is at least three times as long as minimum width of said column section.

12. The metallic sealing ring according to claim 1, wherein said brace section is integrally formed with said column section and said beam sections as a one-piece, unitary member.

13. The metallic sealing ring according to claim 1, where in said first brace section extends from said column section at an angle of approximately 45°.

14. A metallic sealing ring comprising:

a first annular beam section with a first annular sealing surface facing in a first axial direction to contact a first member for creating a first annular sealing dam therebetween;

a second annular beam section with a second annular sealing surface facing in a second axial direction, which is opposite to said first axial direction, to contact a second member for creating a second annular sealing dam therebetween, said first and second annular sealing surfaces being substantially parallel to each other;

an annular inner surface extending between said first and second sealing surfaces to form a central passageway; and an annular outer surface extending between said first and second sealing surfaces and spaced from said annular inner surface to form an annular column section of material extending between said first and second sealing surfaces and substantially perpendicular thereto, one of said annular inner and outer surfaces having an annular recess extending in a substantially radial direction to at least partly define an effective minimum width of said annular column section, said annular recess being configured to form a first diagonal brace section extending from said annular column section to said first beam section; and an annular notch formed in the other of said inner and outer surfaces which does not have said annular recess.

15. The metallic sealing ring according to claim 1, wherein said annular column section has a height lying between approximately 0.020 inch to approximately 1.0 inch.

16. The metallic sealing ring according to claim 1, wherein a second diagonal brace section extends from said annular column section to said second beam section.

17. The metallic sealing ring according to claim 16, wherein said first and second brace sections meet midway between said annular sealing surfaces at said annular column section.

18. The metallic sealing ring according to claim 16, wherein each of said first and second brace sections extends from said column section at an angle of approximately 35° to approximately 55°.

19. The metallic sealing ring according to claim 16, wherein each of said first and second brace sections extend from said column section at an angle of approximately 45°.

20. The metallic sealing ring according to claim 19, wherein
said effective minimum width of said annular column section lies within the range of approximately 0.008 inch to approximately 0.030 inch.

21. The metallic sealing ring according to claim 1, wherein
said annular recess is formed in said annular inner surface.

22. The metallic sealing ring according to claim 1, wherein
said annular recess is formed in said annular outer surface.

23. The metallic sealing ring according to claim 1, wherein
said sealing ring is formed of a corrosion resistant alloy.

24. The metallic sealing ring according to claim 1, wherein
said sealing ring is formed of a material selected from the group of pure nickel, aluminum and stainless steel.

25. A metallic sealing ring comprising:
a first annular beam section with a first annular sealing surface facing in a first axial direction to contact a first member for creating a first annular sealing dam therebetween;
a second annular beam section with a second annular sealing surface facing in a second axial direction, which is opposite to said first axial direction, to contact a second member for creating a second annular sealing dam therebetween, said first and second annular sealing surfaces being substantially parallel to each other;
an annular inner surface extending between said first and second sealing surfaces to form a central passageway; and
an annular outer surface extending between said first and second sealing surfaces and spaced from said annular inner surface to form an annular column section of material extending between said first and second sealing surfaces and substantially perpendicular thereto,
one of said annular inner and outer surfaces having an annular recess extending in a substantially radial direction to at least partly define an effective minimum width of said annular column section, said annular recess being configured to form a first diagonal brace section extending from said annular column section to said first beam section; and
said brace section being formed from a separate piece from said column section.

26. A metallic sealing ring comprising:
a first annular beam section with a first annular sealing surface facing in a first axial direction to contact a first member for creating a first annular sealing dam therebetween;
a second annular beam section with a second annular sealing surface facing in a second axial direction, which is opposite to said first axial direction, to contact a second member for creating a second annular sealing dam therebetween, said first and second annular sealing surfaces being substantially parallel to each other;
an annular inner surface extending between said first and second sealing surfaces to form a central passageway; and
an annular outer surface extending between said first and second sealing surfaces and spaced from said annular inner surface to form an annular column section of material extending between said first and second sealing surfaces and substantially perpendicular thereto,
one of said annular inner and outer surfaces having an annular recess extending in a substantially radial direction to at least partly define an effective minimum width of said annular column section, said annular recess being configured to form a first diagonal brace section extending from said annular column section to said first beam section; and
said column section, said beam sections and said brace section being formed from a separate piece which are fixedly coupled together.

27. A metallic sealing ring comprising:
a first annular beam section with a first substantially flat annular sealing surface facing in a first axial direction to contact a first member for creating a first annular sealing dam therebetween;
a second annular beam section with a second substantially flat annular sealing surface facing in a second axial direction, which is opposite to said first axial direction, to contact a second member for creating a second annular sealing dam therebetween;
an annular inner surface extending between said first and second sealing surfaces to form a central passageway; and
an annular outer surface extending between said first and second sealing surfaces and spaced from said annular inner surface to form an annular column section of material extending between said first and second sealing surfaces and substantially perpendicular thereto,
one of said annular inner and outer surfaces having an annular recess extending in a substantially radial direction to at least partly define an effective minimum width of said annular column section, said annular recess being configured to form a first diagonal brace section extending from said annular column section to said first beam section to control buckling of said first beam section and column section under axial compression of said sealing ring.

28. A metallic sealing ring comprising:
a first annular beam section with a first annular sealing surface facing in a first axial direction to contact a first member for creating a first annular sealing dam therebetween;
a second annular beam section with a second annular sealing surface facing in a second axial direction, which is opposite to said first axial direction, to contact a second member for creating a second annular sealing dam therebetween;
an annular inner surface extending between said first and second sealing surfaces to form a central passageway; and
an annular outer surface extending between said first and second sealing surfaces and spaced from said annular inner surface to form an annular column section of material extending between said first and second sealing surfaces and substantially perpendicular thereto,
one of said annular inner and outer surfaces having an annular recess extending in a substantially radial direction to at least partly define an effective minimum width of said annular column section, said annular recess being configured to form a first diagonal brace section extending from said annular column section to said first beam section to control buckling of said column section and said first beam section, and said metallic sealing ring being made from a deformable material whereby axial compression of said sealing ring causes controlled buckling of said column section.

29. A metallic sealing ring assembly comprising:

first and second sealing members, each sealing member having an opposing sealing surface for receiving a metallic sealing ring, and having a plurality of fasteners for compressing said sealing ring between said sealing members, and a metallic sealing ring comprising:

- a first annular beam section with a first annular sealing surface facing in a first axial direction to contact a first member for creating a first annular sealing dam therebetween;
- a second annular beam section with a second annular sealing surface facing in a second axial direction, which is opposite to said first axial direction, to contact a second member for creating a second annular sealing dam therebetween;
- an annular inner surface extending between said first and second sealing surfaces to form a central passageway; and
- an annular outer surface extending between said first and second sealing surfaces and spaced from said annular inner surface to form an annular column section of material extending between said first and second sealing surfaces and substantially perpendicular thereto,
- one of said annular inner and outer surfaces having an annular recess extending in a substantially radial direction to at least partly define an effective minimum width of said annular column section, said annular recess being configured to form a first diagonal brace section extending from said annular column section to said first beam section to control buckling of said column section and said first beam section, said metallic sealing ring being made from a deformable material whereby axial compression of said sealing ring between sealing members causes controlled buckling of said column section.

* * * * *